March 1, 1966  J. W. ORENDORFF  3,237,702
LINK MEANS FOR VARYING SPRING TENSION ON AN
EARTH WORKING TOOL
Filed March 5, 1962  3 Sheets-Sheet 1

INVENTOR.
John W. Orendorff
Atty.

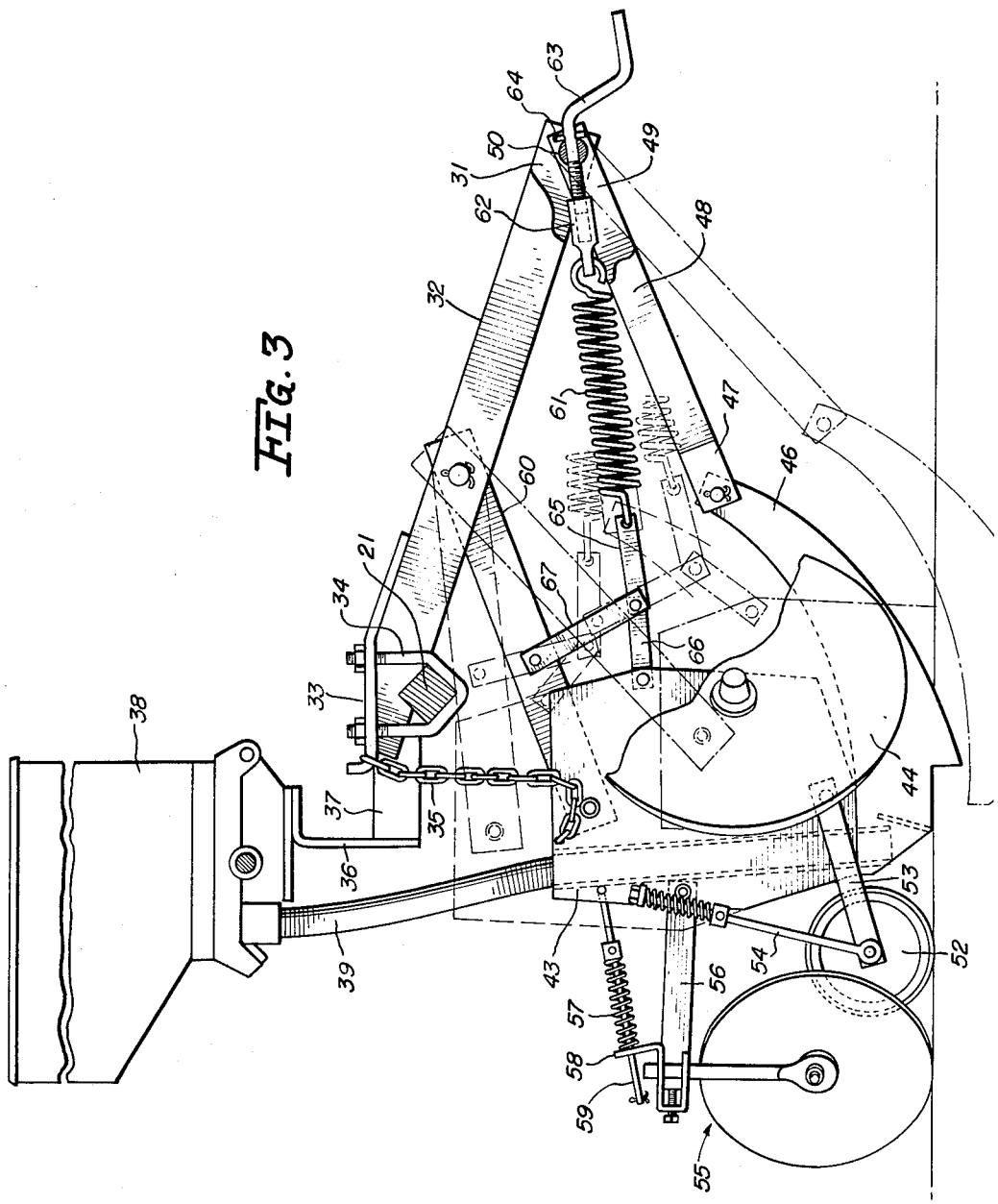

March 1, 1966 J. W. ORENDORFF 3,237,702
LINK MEANS FOR VARYING SPRING TENSION ON AN
EARTH WORKING TOOL
Filed March 5, 1962 3 Sheets-Sheet 3
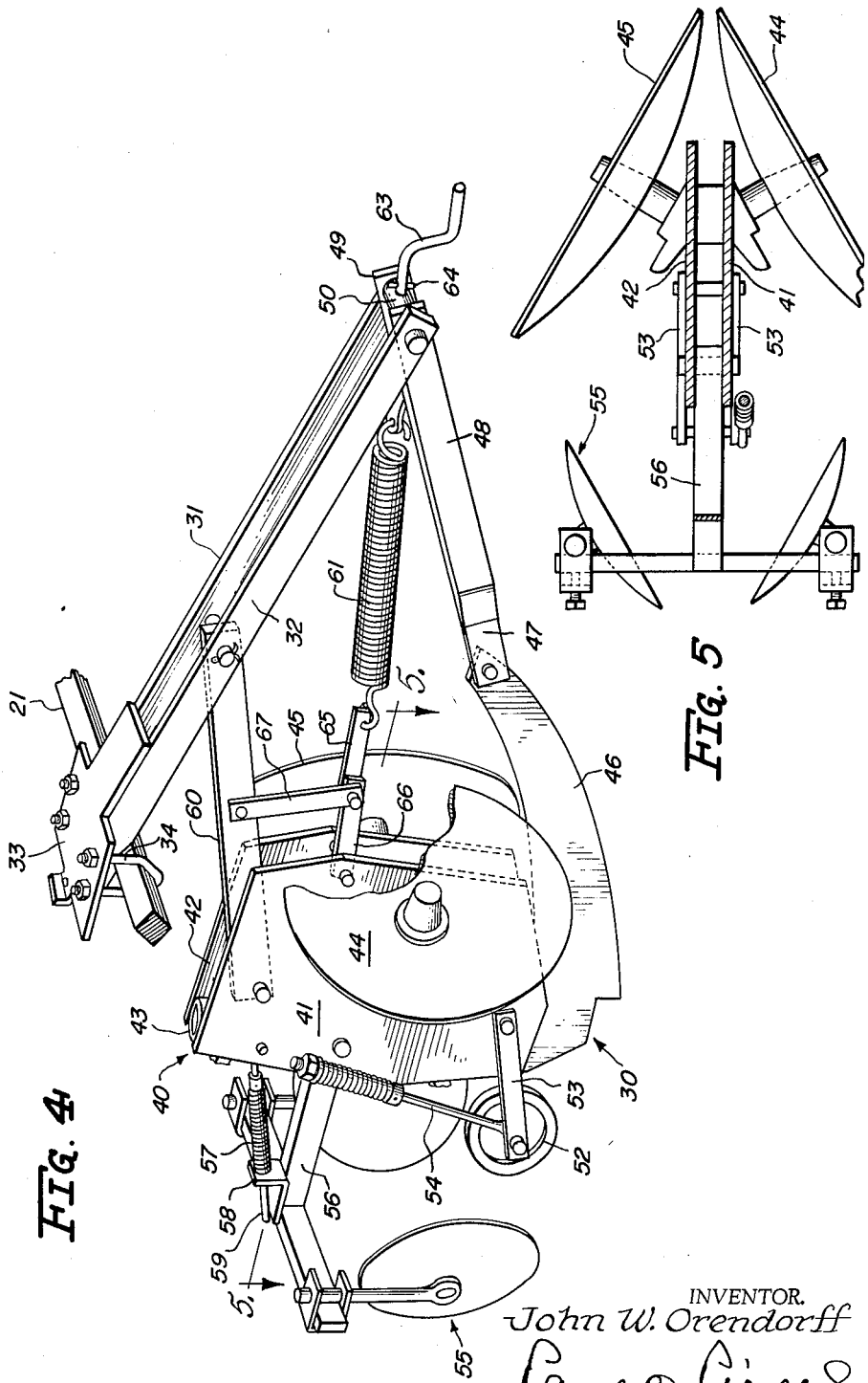

United States Patent Office 3,237,702
Patented Mar. 1, 1966

3,237,702
LINK MEANS FOR VARYING SPRING TENSION
ON AN EARTH WORKING TOOL
John W. Orendorff, Downers Grove, Ill., assignor to International Harvester Company, Chicago, Ill., a corporation of New Jersey
Filed Mar. 5, 1962, Ser. No. 177,325
1 Claim. (Cl. 172—705)

This invention relates in general to agricultural implements, and more particularly to an earthworking unit mounted on a supporting frame for swinging movement with respect thereto in a substantially vertical plane.

In the agricultural implement field, it is well known to provide an earthworking unit with spring means pressing the unit into constant engagement with the ground. These arrangements have proven highly unsatisfactory when working a field of uneven contour, since the earthworking unit has exhibited a tendency to plow a deeper furrow in a raised terrace than in flat ground. The general purpose of the present invention is therefore to provide an earthworking unit with a floating connection to a supporting frame, so as to allow the earthworking unit to exert a constant down pressure upon the ground and to plow a furrow of constant depth regardless of the irregularities in the contours of the earth.

Another object of the invention is to provide an earthworking unit of the type described with means for adjusting the initial down pressure of the unit upon the ground, so as to render the machine capable of plowing furrows of variable depth.

A further object of the invention is the provision of a floating connection between an earthworking unit and a supporting frame, which allows the earthworking unit to swing in a substantially vertical plane with respect to the supporting frame.

Other objects and advantages of the invention will hereinafter become more fully apparent from the following description of the annexed drawings which illustrate a preferred embodiment of the invention, and wherein:

FIGURE 3 is a side elevational view similar to FIGURE 2, but on an enlarged scale, showing the earthworking unit in three positions;

FIGURE 4 is a perspective view of the earthworking unit employing the present invention, with certain parts removed for clarity, and FIGURE 5 is a section view taken along line 5—5 of FIGURE 4.

Figure 1:
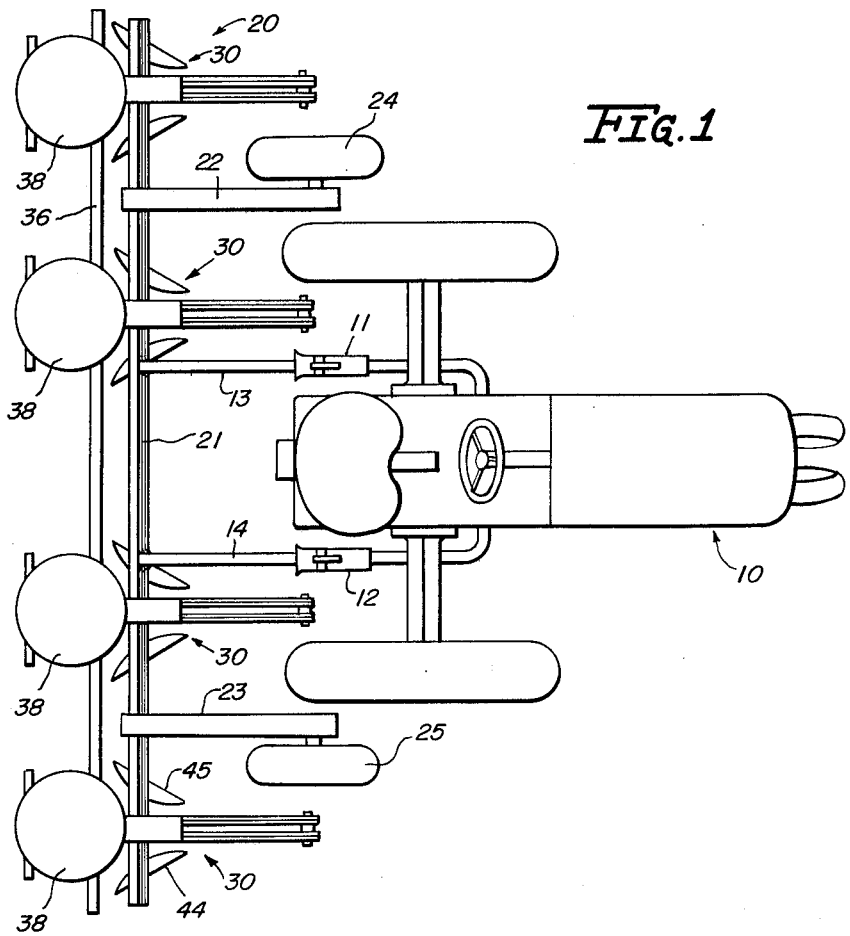
FIGURE 1 is a plan view of a flexible loose ground lister employing the present invention.
Figure 2:
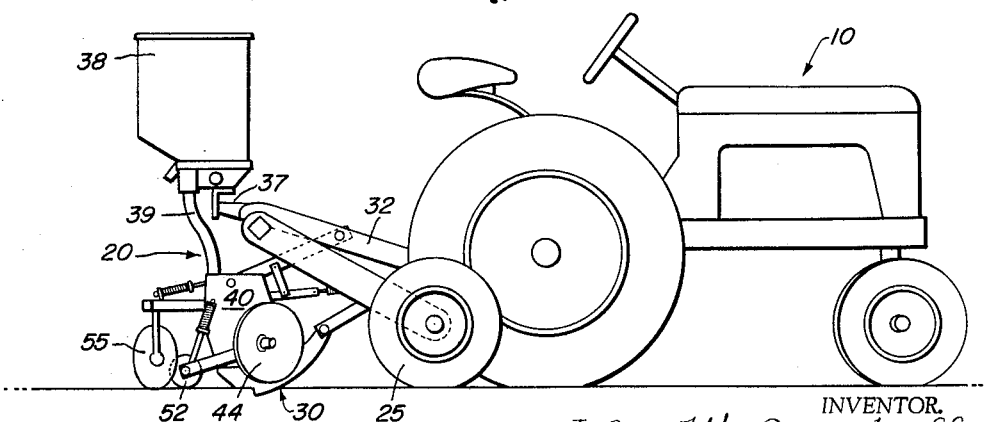
FIGURE 2 is a side elevational view of FIGURE 1.

Referring now to the drawings, wherein like reference characters designate like or corresponding parts throughout the several views, there is shown in FIGURES 1 and 2 a lister embodying the present invention mounted behind a tractor of conventional construction indicated in its entirety by reference numeral 10. It will be noted that tractor 10 is provided with hitch sockets 11 and 12 for reception of coupling prongs 13 and 14 mounted on the lister unit.

The lister unit, generally indicated at 20, is provided with a tool bar 21 extending transversely with respect to tractor 10. Tool bar 21 is provided with a pair of depending standards 22 and 23, on which gauge wheels 24 and 25 are mounted.

A plurality of identical earthworking units 30 are mounted at spaced-apart points along tool bar 21. Each earthworking unit 30 is swingably connected to a frame member consisting of a pair of spaced-apart straps 31 and 32. A bracket 33, containing a plurality of apertures, is fixedly secured to the rearwardly extending end of straps 31 and 32, as by welding or the like. Straps 31 and 32 are adjustably mounted upon tool bar 21 by the cooperation of U-bolt assemblies 34 with the apertures in bracket 33. As seen in FIGURE 3, a chain 35 is secured at one end to bracket 33 and at the other end to earthworking unit 30 to limit the downward swinging movement of the earthworking unit with respect to straps 31 and 32, as will hereinafter become more apparent.

An L-shaped bracket member 36 extends transversely across the lister frame, and is secured to tool bar 21 by rearwardly extending arms 37. A plurality of seed dispensing hoppers 38 are mounted at spaced-apart points along bracket 36 in substantial fore and aft alignment with straps 31 and 32. A flexible seed tube 39 cooperates with hopper 38 to convey the seed into a seed boot 40 from whence the seed is deposited into the ground.

Boot 40 consists of a pair of spaced-apart substantially rectangularly shaped plates 41 and 42. Boot 40 is provided adjacent its rearward end with a cylindrical chute 43 which cooperates with seed tube 39 to convey the seed into the furrow opened by earthworking unit 30.

In the embodiment shown, the boot of each earthworking unit is provided with a pair of disk type furrow openers 44 and 45 rotatably mounted on plates 41 and 42, respectively for furrowing loose ground. Each earthworking unit is further provided with a runner type furrow opener 46 which opens the furrow to the proper depth for reception of the seeds.

A lower link 47 is pivotally secured at one end to the forwardly extending end of runner type furrow opener 46. Link 47 is provided at its other end with bifurcated leg portions 48 and 49, which are pivotally secured to strap members 31 and 32 by a pin 50.

A seed firming wheel 52 is provided adjacent the rearward end of boot 40 for pressing the seed into intimate engagement with the ground. Seed firming wheel 52 is mounted for vertical swinging movement by arms 53, which are pivotally secured to and straddle plates 41 and 42. A spring biased pressure rod 54 is fixedly secured to arm 53, and urges seed firming wheel 52 into constant engagement with the ground.

Each earthworking unit is further provided with a disk type covering assembly 55 pivotally secured to boot 40 by a forwardly extending arm 56. A rod 59 is pivotally secured to boot 40 and is slidingly received in an upstanding bracket 58 on arm 56. A spring 57 surrounds rod 59 and bears against bracket 58 to urge the covering unit into engagement with the ground.

An upper link 60 is pivotally mounted at one end between straps 31 and 32, and at the other end is pivotally mounted between plates 41 and 42 of boot 40. From an examination of FIGURE 3 and FIGURE 4 it will be noted that upper link 60 is substantially parallel to lower link 48. This arrangement enables the earthworking unit to swing in a substantially vertical plane, thus assuring the proper attitude of the earthworking unit with respect to the ground regardless of the elevation of the earthworking unit with respect to its supporting frame.

Tension spring means 61 are provided for maintaining the proper amount of down pressure on the earthworking unit. Turnbuckle means consisting of an internally threaded sleeve 62 and a threaded handle 63 are provided for adjusting the initial tension in spring member 61. Handle 63 is slidably received in pin 50, and is retained in position by cotter pin 64 or the like.

The amount of down pressure which the earthworking unit exerts upon the ground is a direct function of the distance between the pivotal connection of link 60 with straps 31 and 32 and the axis of spring 61, said distance constituting a lever arm through which spring 61 acts. With particular reference to FIGURE 3 it will be noted that spring 61 is expanded when the earthworking unit is in a raised operating position, and that spring 61 has contracted when the earthworking unit is in a lower position as when traveling over terraced land. It should therefore be apparent that in order to maintain uniform down pressure on the earthworking unit, the length of the lever arm must be shortened as the earthworking unit is swung upward, and must be lengthened as the earthworking unit is swung downward. To accomplish this result spring 61 is connected to a first link 65, which is pivotally connected to a second link 66, which is in turn pivotally mounted between side plates 41 and 42 of boot 40. A third link 67 is pivotally secured at the junction of links 65 and 66, and is pivotally secured at its other end to an intermediate portion of upper link 60.

From an examination of FIGURE 3 it is apparent that as the earthworking unit moves upwardly over a rise the lever arm constituting the distance between the pivotal connection of upper link 60 with straps 31 and 32 and the axis of spring 61 is shortened. As upper link 60 swings about its pivotal connection with straps 31 and 32 links 65 and 67 cooperate to extend spring 61; however the pivoting action of link 66 about its connection with links 65 and 67 prevents spring 61 from undue expansion, thereby causing the earthworking unit to exhibit substantially the same down pressure upon the ground in the raised position. With the earthworking unit in a lowered position, it will be noted that the distance between the axis of spring 61 and the pivotal connection of link 60 with straps 31 and 32 has been increased; however, due to the downward pivoting of link 66 the contraction of spring 61 is controlled, and the resulting down pressure of the earthworking unit upon the ground is substantially the same as when it is in a normal or raised position. Link 66 therefore serves as a take up means automatically varying the effective length of the spring in proportion to the change in length of said lever arm to control the expansion and contraction of spring 61 and enable the earthworking unit to exert a uniform pressure upon the ground regardless of the position of the earthworking unit with respect to the supporting frame.

It should be understood, of course, that the foregoing disclosure relates to only a preferred embodiment of the invention, and that numerous modifications or alterations may be made therein without departing from the spirit and the scope of the invention as set forth in the appended claim.

What is claimed is:

In an agricultural implement having an earthworking unit mounted on a supporting frame, means accommodating vertical swinging movement of said unit with respect to said frame comprising, upper and lower substantially parallel links each having one end pivotally secured to said unit and the other end pivotally secured to said frame, spring means having one end connected to said frame at a point vertically spaced from said upper link and having the other end connected to said unit, the distance between the pivotal connection of said upper link with said frame and the axis of said spring means constituting a lever arm the length of which determines the amount of down pressure exerted on said earthworking unit, and spring tension adjustment means in the connection of said spring means to said unit for automatically and gradually varying the effective length of the spring in inverse proportion to the change in length of said lever arm to thereby maintain substantially uniform down pressure on the unit throughout its range of vertical swinging in response to variations in ground level, said spring tension adjustment means comprising a first link having one end operatively secured to said other end of said spring means, a second link pivotally secured at one end to the other end of said first link and having its other end pivotally secured to said earth-working unit, and a third link having one end connected to an intermediate portion of said upper link and having its other end associated with said second link, said third link being responsive to movement of said upper link to change the length of said spring means, said second link being responsive to vertical movement of said unit to limit the action of said third link upon said spring.

References Cited by the Examiner

UNITED STATES PATENTS

| | | | |
|---|---|---|---|
| 1,069,002 | 7/1913 | Hackney | 172—500 |
| 1,501,652 | 7/1924 | Ferguson | 172—239 |
| 2,899,776 | 8/1959 | Arnold | 172—239 |

FOREIGN PATENTS

| | | |
|---|---|---|
| 107,929 | 7/1939 | Australia. |
| 110,020 | 3/1940 | Australia. |

ABRAHAM G. STONE, *Primary Examiner.*

A. JOSEPH GOLDBERG, ANTONIO F. GUIDA, T. GRAHAM CRAVER, *Examiners.*